United States Patent
Yoshida et al.

(10) Patent No.: US 6,813,092 B2
(45) Date of Patent: Nov. 2, 2004

(54) ZOOM LENS APPARATUS

(75) Inventors: Shigeru Yoshida, Saitama (JP); Takahiro Shimakura, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/612,951

(22) Filed: Jul. 7, 2003

(65) Prior Publication Data

US 2004/0008421 A1 Jan. 15, 2004

(30) Foreign Application Priority Data

Jul. 11, 2002 (JP) ........................................ 2002-202909

(51) Int. Cl.[7] ............................................... G02B 15/14
(52) U.S. Cl. ...................... 359/698; 359/355; 359/696; 359/697; 359/821; 359/823; 359/824; 359/829; 359/830
(58) Field of Search ................................ 359/354, 355, 359/694–701, 683, 691, 811, 821–824, 829–830

(56) References Cited

U.S. PATENT DOCUMENTS

| | | | | | |
|---|---|---|---|---|---|
| 4,976,523 A | * | 12/1990 | Ishikawa | .................... | 359/684 |
| 5,016,993 A | * | 5/1991 | Akitake | ....................... | 359/696 |
| 5,144,491 A | * | 9/1992 | Ushiro et al. | ................ | 359/697 |
| 5,172,276 A | * | 12/1992 | Ueyama et al. | .............. | 359/813 |
| 5,448,413 A | * | 9/1995 | Kobayashi et al. | .......... | 359/698 |
| 5,677,791 A | * | 10/1997 | Yoshibe et al. | .............. | 359/554 |
| 5,691,854 A | | 11/1997 | Yoshida et al. | .............. | 359/823 |

FOREIGN PATENT DOCUMENTS

JP  8-94911  4/1996

* cited by examiner

Primary Examiner—Evelyn A. Lester
(74) Attorney, Agent, or Firm—Young & Thompson

(57) ABSTRACT

In the zoom lens apparatus, a lens frame for a variable-magnification lens or a correcting lens is configured of an inner frame and an outer frame, and any focus blurring due to variations in wavelength of subject light can be compensated for accurately by shifting the inner frame holding the lens relative to the outer frame. The correcting lens frame for the correcting lens is configured of the inner frame and the outer frame, and the inner frame is shifted according to variations in wavelength of subject light. Any focus blurring can be thereby compensated for steplessly according to variations in wavelength of subject light.

4 Claims, 2 Drawing Sheets

ZOOM LENS APPARATUS

BACKGROUND OF THE INVENTION

1. Field of the Invention

The present invention relates to a zoom lens apparatus, and more particularly to a zoom lens apparatus to be applied to monitoring cameras for use in daytime and nighttime.

2. Description of the Related Art

In a mechanical compensation type zoom lens apparatus applied to monitoring cameras, any focus blurring due to the shifting of a variable-magnification lens is compensated for by shifting a correcting lens interlocked with the variable-magnification lens.

However, as the shifting of the correcting lens in a conventional zoom lens apparatus is regulated so as to compensate for any focus blurring when in use under visible light, there is a problem that, when the apparatus is used under infrared light at nighttime or whenever else, the shot goes out of focus under the influence of chromatic aberrations due to a difference in wavelength of subject light.

In view of this problem, in a zoom lens apparatus according to Japanese Patent Application Publication No. 8-94911, one of the inner wall faces of a cam groove for regulating the shifting of the correcting lens is shaped for visible light, and the other for infrared light, and any focus blurring due to a difference in wavelength of subject light is compensated for by switching the face that comes into contact with a cam pin according to the wavelength ranges to be used.

However, since the zoom lens apparatus according to Japanese Patent Application Publication No. 8-94911 permits only two alternative peak wavelength ranges to choose from, its versatility is limited, resulting in a disadvantage that accurate focusing compensation according to the shooting environment is impossible.

SUMMARY OF THE INVENTION

An object of the present invention, attempted in view of this circumstance, is to provide a zoom lens apparatus capable of accurately compensating for any focus blurring due to variations in wavelength of subject light.

In order to attain the above-described object, the present invention is directed to a zoom lens apparatus, comprising: a variable-magnification lens which is held by a first lens frame and movable along an optical axis in a lens barrel; and a correcting lens which is held by a second lens frame and movable along the optical axis in the lens barrel, wherein: the variable-magnification lens is shifted so as to vary a focal distance of the zoom lens, and the correcting lens is shifted so as to compensate for any focus blurring due to the shifting of the variable-magnification lens; at least one of the first and second lens frames comprises: an inner frame which holds the lens; an outer frame which holds the inner frame to be shiftable back and forth along the optical axis; and a drive device which shifts the inner frame back and forth relative to the outer frame; and any focus blurring due to variations in wavelength of subject light is compensated for by causing the drive device to shift the inner frame relative to the outer frame and thereby shifting at least one of the variable-magnification lens and the correcting lens.

Preferably, the inner frame and the outer frame have a threaded outer surface and a threaded inner surface, respectively, engaged with each other; and the drive device is arranged on the outer frame and rotates the inner frame relative to the outer frame so as to shift the inner frame back and forth along the optical axis.

Preferably, the zoom lens apparatus further comprises: a selector device which selects a wavelength of subject light; a memory device in which information on a position on the inner frame relative to the outer frame is stored for each wavelength of subject light selectable by the selector device; and a control device which so controls the drive device as to shift the inner frame to the position matching the wavelength of subject light selected by the selector device according to the information stored in the memory device.

According to the present invention, the lens frame for the variable-magnification lens or the correcting lens is configured of an inner frame and an outer frame, and the variable-magnification lens or the correcting lens is shifted along the optical axis as the drive device shifts the inner frame relative to the outer frame. This makes it possible to compensate for any focus blurring due to wavelength variations steplessly.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A zoom lens apparatus, which is a preferred embodiment of the present invention, will be described in detail below with reference to the accompanying drawings.

Figure 1:
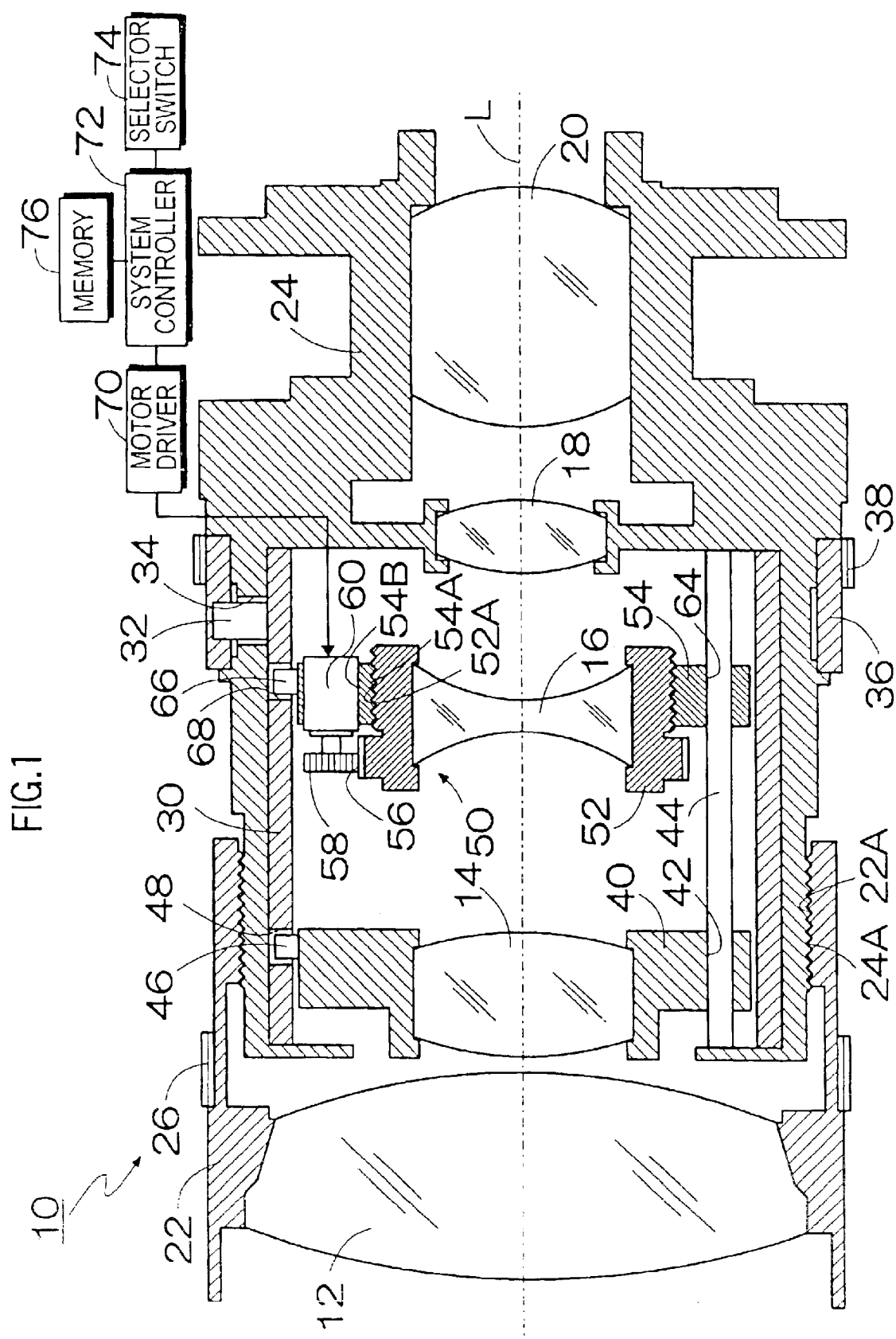
FIG. 1 shows a sectional view of a zoom lens apparatus, which is a preferred embodiment of the present invention.

FIG. 1 shows a sectional view of a zoom lens apparatus 10 according to an embodiment of the present invention. As shown in this drawing, a focusing lens 12, a variable-magnification lens 14, a correcting lens 16 and relay lenses 18 and 20 are arranged in the zoom lens apparatus 10 in that order from front to back along the optical axis L.

The focusing lens 12 is held by a focusing ring 22. On the inner circumference of the base end of the focusing ring 22 is formed a female thread 22A, and this female thread 22A is engaged with a male thread 24A formed on the outer circumference of an end of a zoom lens apparatus body 24.

On the outer circumference of this focusing ring 22 is formed a focusing gear 26, which is engaged with a drive gear (not shown). To the drive gear is linked a focusing motor (not shown), and the focusing ring 22 is rotated by driving this focusing motor. The rotation of this focusing ring 22 causes the actions of the male thread 24A and the female thread 22A to shift the focusing ring 22 back and forth relative to the zoom lens apparatus body 24. As a result, the focusing lens 12 shifts back and forth along the optical axis L to achieve focusing control.

Within the zoom lens apparatus body 24 is arranged a cam cylinder 30 rotatably around the optical axis L. On the outer circumference of the base end of this cam cylinder 30 is erected an interlocking pin 32. The interlocking pin 32 is linked to a zoom ring 36 via a slit 34 formed in the circumferential direction along the circumferential face of the zoom lens apparatus body 24.

The zoom ring 36 is provided rotatably along the outer circumference of the zoom lens apparatus body 24, and a zoom gear 38 is provided on its outer circumference. A drive gear (not shown) is engaged with the zoom gear 38, and to the drive gear is linked a zoom motor (not shown). The zoom ring 36 is rotated by driving this zoom motor, and the rotation of this zoom ring 36 is transmitted to the cam cylinder 30 via the interlocking pin 32 to cause the cam cylinder 30 to rotate round the optical axis L.

The variable-magnification lens 14, held by a variable-magnification lens frame 40, is arranged within the cam cylinder 30. In the variable-magnification lens frame 40 are formed a pair of straight guide holes 42 (only one of which is shown) along the optical axis L, and straight guide rods 44 (only one of which is shown) are pressed through the straight guide holes 42. The straight guide rods 44 are arranged in parallel to the optical axis L, and both ends of each are fixed to the zoom lens apparatus body 24.

On the outer circumference of this variable-magnification lens frame 40 is erected a cam pin 46, and the cam pin 46 is engaged with a variable-magnification cam groove 48 formed in the cam cylinder 30. When the cam cylinder 30 is rotated, the variable-magnification lens frame 40 shifts back and forth in the direction of the optical axis L along the locus of this variable-magnification cam groove 48.

The correcting lens 16, held by a correcting lens frame 50, is arranged within the cam cylinder 30. This correcting lens frame 50 is configured of an inner frame 52 and an outer frame 54, and the correcting lens 16 is held by the inner frame 52.

On the outer circumference of the base end of the inner frame 52 is formed a male thread 52A, and this male thread 52A is engaged with a female thread 54A formed on the inner circumference of the outer frame 54.

Figure 2A:
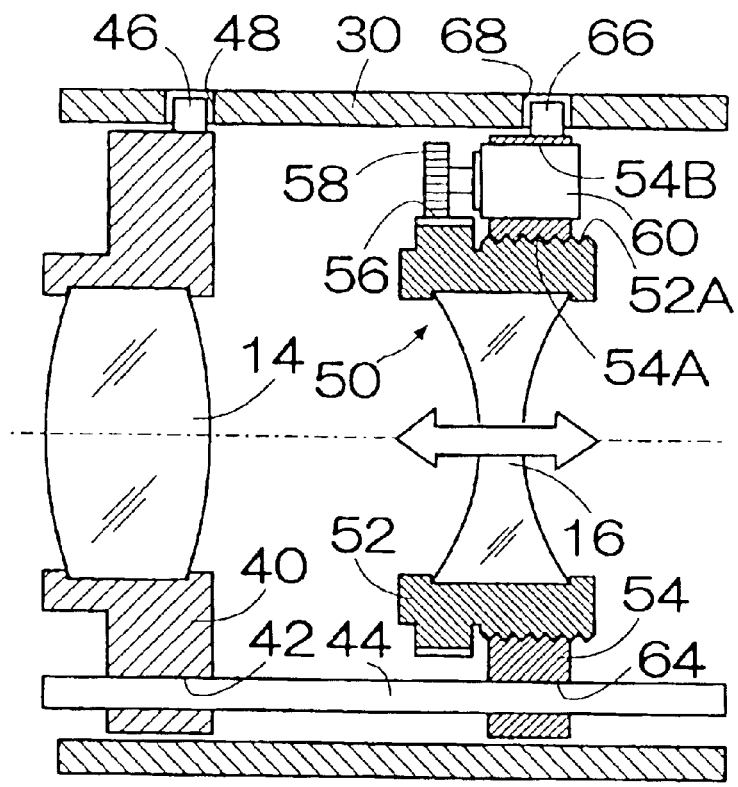
FIGS. 2(a) and 2(b) show sectional views of the shifting state of a correcting lens.
Figure 2B:
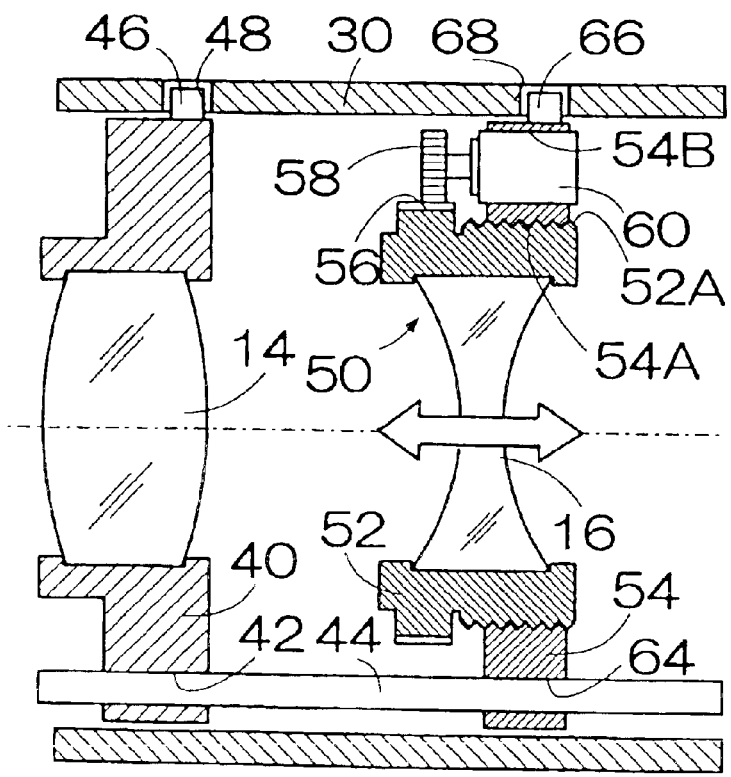

On the outer circumference of an end of the inner frame 52 is formed a wide inner frame gear 56. With this inner frame gear 56 engaged is a drive gear 58, and the drive gear 58 is linked to the output shaft of an inner frame drive motor 60. The inner frame drive motor 60 is held by a motor holding portion 54B formed on the outer frame 54, and by driving this inner frame drive motor 60 the inner frame 52 is rotated round the optical axis L. As this inner frame 52 rotates, the actions of the male thread 52A and the female thread 54A cause the inner frame 52 to shift back and forth relative to the outer frame 54 along the optical axis L as shown in FIGS. 2(a) and 2(b).

The inner frame drive motor 60 is under drive control by a system controller 72 via a motor driver 70. The system controller 72 drives the inner frame drive motor 60 on the basis of input information from a selector switch 74 and data stored in a memory 76, both provided outside the zoom lens apparatus, and shifts the inner frame 52 to a prescribed position. The method of controlling this drive will be described in detail afterwards.

In the outer frame 54 are formed a pair of straight guide holes 64 (only one of which is shown) along the optical axis L, and the straight guide rods 44 (only one of which is shown) are pressed through the straight guide holes 64.

On the outer circumference of this outer frame 54 is erected a cam pin 66, and the cam pin 66 is engaged with the correcting cam groove 68 formed in the cam cylinder 30. When the cam cylinder 30 is rotated, the outer frame 54 shifts back and forth in the direction of the optical axis L along the locus of this correcting cam groove 68.

The zoom lens apparatus 10 is configured as described above. When its cam cylinder 30 is rotated via the zoom ring 36, the variable-magnification lens 14 and the correcting lens 16 shift in the direction of the optical axis L along the loci of the variable-magnification cam groove 48 and the correcting cam groove 68, enabling the focal distance to be varied while keeping the in-focus position constant. Thus, the focal distance is varied by the shifting of the variable-magnification lens 14, and any focus blurring due to this shifting of the variable-magnification lens 14 is compensated for by the shifting of the correcting lens 16 to make it possible to vary the focal distance while keeping the in-focus position constant.

As described above, when the wavelength band used by the zoom lens apparatus varies, the shot goes out of focus under the influence of chromatic aberrations due to a difference in wavelength of subject light.

On the other hand, in the zoom lens apparatus 10, the correcting lens frame 50 holding the correcting lens 16 is configured of the inner frame 52 and the outer frame 54 as described above, and the inner frame 52 holding the correcting lens 16 is provided to be shiftable back and forth relative to the outer frame 54. For this reason, by shifting the inner frame 52 relative to the outer frame 54, the position of the correcting lens 16 can be altered. Therefore, any focus blurring due to a difference in wavelength of subject light can be compensated for by changing over the position of this correcting lens 16 according to the wavelength of subject light in a given shooting environment. This compensation for focus blurring due to a difference in wavelength of subject light is accomplished in the following manner.

In the selector switch 74 provided outside the zoom lens apparatus, a plurality of peak wavelengths to choose from are set in advance, and information on a position on the inner frame 52 is stored in the memory 76 for each peak wavelength available for selection by this selector switch 74. The selector switch 74 is set to be able to select one of four peak wavelengths including, for instance, (1) visible light, (2) 850 nm, (3) 880 nm, and (4) 900 nm, and information on a position on the inner frame 52 is stored in the memory 76 for each wavelength.

When the user selects with the selector switch 74 the wavelength to be used, information on the wavelength selected with this selector switch 74 is entered into the system controller 72. The system controller 72 judges the position on the inner frame 52 matching the selected wavelength from data recorded in the memory 76, and so controls driving by the inner frame drive motor 60 via the motor driver 70 as to cause the inner frame 52 to shift to that position. This causes only the inner frame 52 holding the correcting lens 16 to shift along the optical axis L to compensate for any focus blurring due to a difference in wavelength.

The inner frame drive motor for use in this embodiment of the present invention may be a stepping motor or a motor combined with a sensor such as a potentiometer.

Thus the zoom lens apparatus 10, as it enables the correcting lens 16 to shift steplessly independently by itself, can finely correct focusing according to variations in wavelength of subject light in a given shooting environment. It is thereby enabled to compensate for any focus blurring due to wavelength fluctuations between nighttime and daytime on a real time basis, and keep the shot exactly in focus in daytime and nighttime.

Although this embodiment is so configured as to choose with a selector switch the peak wavelength to be used out of preset peak wavelengths, it can as well be configured to permit stepless selection with a lever or the like.

Also, though this embodiment is so configured as to allow the user to choose with the selector switch 74 the peak wavelength to be used and set it, it is also acceptable to provide a sensor which detects the peak wavelength in a given shooting environment, and to automatically correct the position of the correcting lens 16 on the basis of information on the detection by this sensor.

Further, though compensation for any focus blurring due to variations in wavelength of subject light is compensated for by shifting the correcting lens 16 in this embodiment, compensation can as well be accomplished by shifting the variable-magnification lens 14. In this case, the frame for the variable-magnification lens could be configured similarly to that for the correcting lens described above.

As hitherto described, according to the present invention, any focus blurring can be compensated for steplessly according to variations in wavelength of subject light by configuring the lens frame of an inner frame and an outer frame and shifting the inner frame holding the lens steplessly relative to the outer frame. This makes it possible to compensate for any focus blurring due to wavelength variations between nighttime and daytime on a real time basis, and to keep the shot exactly in focus in daytime and nighttime.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A zoom lens apparatus, comprising:
   a variable-magnification lens which is held by a first lens frame and movable along an optical axis in a lens barrel; and
   a correcting lens which is held by a second lens frame and movable along the optical axis in the lens barrel, wherein:
   the variable-magnification lens is shifted so as to vary a focal distance of the zoom lens, and the correcting lens is shifted so as to compensate for any focus blurring due to the shifting of the variable-magnification lens;
   at least one of the first and second lens frames comprises:
     an inner frame which holds the lens;
     an outer frame which holds the inner frame to be shiftable back and forth along the optical axis; and
     a drive device which shifts the inner frame back and forth relative to the outer frame; and
   any focus blurring due to variations in wavelength of subject light is compensated for by causing the drive device to shift the inner frame relative to the outer frame and thereby shifting at least one of the variable-magnification lens and the correcting lens.

2. The zoom lens apparatus as defined in claim 1, further comprising:
   a selector device which selects a wavelength of subject light;
   a memory device in which information on a position on the inner frame relative to the outer frame is stored for each wavelength of subject light selectable by the selector device; and
   a control device which so controls the drive device as to shift the inner frame to the position matching the wavelength of subject light selected by the selector device according to the information stored in the memory device.

3. The zoom lens apparatus as defined in claim 1, wherein:
   the inner frame and the outer frame have a threaded outer surface and a threaded inner surface, respectively, engaged with each other; and
   the drive device is arranged on the outer frame and rotates the inner frame relative to the outer frame so as to shift the inner frame back and forth along the optical axis.

4. The zoom lens apparatus as defined in claim 3, further comprising:
   a selector device which selects a wavelength of subject light;
   a memory device in which information on a position on the inner frame relative to the outer frame is stored for each wavelength of subject light selectable by the selector device; and
   a control device which so controls the drive device as to shift the inner frame to the position matching the wavelength of subject light selected by the selector device according to the information stored in the memory device.

* * * * *